US012743238B2

(12) United States Patent
Zhang et al.

(10) Patent No.: US 12,743,238 B2
(45) Date of Patent: Sep. 22, 2026

(54) METHOD, ELECTRONIC DEVICE, AND NON-TRANSITORY COMPUTER-READABLE RECORDING MEDIUM FOR ADJUSTING AN EXECUTION ORDER OF COMMANDS

(71) Applicant: Hefei Kaimeng Technology Co., Ltd., Anhui (CN)

(72) Inventors: Rui Zhang, Anhui (CN); Hong Yan Zhang, Anhui (CN); Jing Zhang, Anhui (CN); Xu Xiu Liu, Anhui (CN); Tsung-Lin Wu, Anhui (CN); Qiao Zhu, Anhui (CN)

(73) Assignee: Hefei Kaimeng Technology Co., Ltd., Anhui (CN)

( * ) Notice: Subject to any disclaimer, the term of this patent is extended or adjusted under 35 U.S.C. 154(b) by 0 days.

(21) Appl. No.: 19/019,403

(22) Filed: Jan. 13, 2025

(65) Prior Publication Data

US 2025/0370658 A1 Dec. 4, 2025

(30) Foreign Application Priority Data

Jun. 4, 2024 (CN) ......................... 202410720523.7

(51) Int. Cl.
*G06F 3/06* (2006.01)

(52) U.S. Cl.
CPC .......... *G06F 3/0659* (2013.01); *G06F 3/0611* (2013.01); *G06F 3/0679* (2013.01)

(58) Field of Classification Search
CPC ..... G06F 3/0659; G06F 3/0611; G06F 3/0679
See application file for complete search history.

(56) References Cited

U.S. PATENT DOCUMENTS 6,088,772 A * 7/2000 Harriman ............ G06F 13/1631 711/158
6,112,265 A * 8/2000 Harriman ................ G06F 3/061 710/39
6,385,708 B1 * 5/2002 Stracovsky ......... G06F 13/1605 711/158
2019/0279660 A1 * 9/2019 Ehrlich .................. G11B 5/012
2022/0004337 A1 * 1/2022 Cariello ................ G06F 3/0679
2025/0103381 A1 * 3/2025 Radhakrishnan ......... G06F 9/48

* cited by examiner

*Primary Examiner* — Eric T Loonan
(74) *Attorney, Agent, or Firm* — JCIPRNET

(57) ABSTRACT

The invention provides a command processing method, an electronic device, and a non-transitory computer-readable recording medium. The command processing method includes receiving a command issued by a host system and generating a corresponding command unit, treating a plurality of consecutive command units as a same command group, determining a first execution order value of each of the command units based on a command type, determining a second execution order value of each of the command units based on a time interval between each of the command units and a size of each of the command units, and adjusting an execution order of each of the command units in each of the command groups according to the first execution order value and the second execution order value of each of the command units to improve the processing efficiency of the command.

9 Claims, 5 Drawing Sheets

METHOD, ELECTRONIC DEVICE, AND NON-TRANSITORY COMPUTER-READABLE RECORDING MEDIUM FOR ADJUSTING AN EXECUTION ORDER OF COMMANDS

CROSS-REFERENCE TO RELATED APPLICATION

This application claims the priority benefit of China application serial no. 202410720523.7 filed on Jun. 4, 2024. The entirety of the above-mentioned patent application is hereby incorporated by reference herein and made a part of this specification.

BACKGROUND OF THE INVENTION

Field of the Invention

The invention relates to the field of storage technique, and in particular to a command processing method of a universal flash memory storage memory, an electronic device, and a non-transitory computer-readable recording medium.

Description of Related Art

After receiving a host end command, the Universal Flash Storage (UFS) adopts a command queue to process commands sent by the upper layer. Generally, when a device executes commands in the command queue, the device executes the commands in the order in which the commands enter the queue. As a result, sometimes the waiting time for subsequent commands to be processed is too long, and the host end may not receive data feedback in time.

Therefore, how to effectively improve the efficiency of the UFS memory in processing commands issued by the host end is one of the issues those skilled in the art want to solve.

SUMMARY OF THE INVENTION

The invention provides a command processing method, an electronic device, and a non-transitory computer-readable recording medium that may improve the efficiency of a UFS memory in processing consecutive commands of a host end.

In an exemplary embodiment of the invention, a command issued by a host system is received and a corresponding command unit is generated, and a plurality of consecutive command units are treated as a same command group; a first execution order value of each of the command units is determined based on a command type; a second execution order value of each of the command units is determined based on a time interval between each of the command units and a size of each of the command units; and an execution order of each of the command units in each of the command groups is adjusted according to the first execution order value and the second execution order value of each of the command units.

The first execution order value and the second execution order value are determined respectively according to the command type, the time interval, and the size of the command unit, and the execution order is adjusted by dividing the priorities in two dimensions to improve the execution efficiency of commands within consecutive commands.

In an exemplary embodiment of the invention, the step of determining the second execution order value of each of the command units based on the time interval between each of the command units and the size of each of the command units generated corresponding to each of the commands further includes: obtaining a data length needed to be transmitted by each of the command units; and determining a first ratio of each of the command units according to the data length needed to be transmitted by each of the command units and the size of each of the command units.

The size of the command unit is related to the processing time of the command, and for commands involving data transmission, the length of the data to be transmitted also affects the execution delay of the command unit. The ratio of the data length to be transmitted by each of the command units and the size of each of the command units determines the time ratio needed for the parsing and the data transmission stages, and reasonable allocation of the command sequence may improve the overall execution efficiency within the command group.

In an exemplary embodiment of the invention, the step of determining the second execution order value of each of the commands based on the time interval between each of the command units and the size of the command unit generated corresponding to each of the commands further includes: determining a second execution order value of each of the commands based on the time interval between each of the command units and the first ratio of each of the command units.

In an exemplary embodiment of the invention, the step of determining the second execution order value of each of the commands based on the time interval between each of the command units and the first ratio of each of the command units further includes: setting a first weight and a second weight for the time interval between each of the command units and the first ratio respectively; and determining a second execution order value of each of the commands based on the time interval between each of the command units and the first weight, the first ratio, and the second weight.

Adding a time interval may reduce the situation in which commands that are earlier in the time sequence have to wait for a long time, and applying different weight factors may freely determine the influence factor of each element according to the actual situation.

In an exemplary embodiment of the invention, the time interval between consecutive command units in the same command group is less than a predetermined threshold.

If the time interval is too large, the impact on the execution time far exceeds the scope of optimization by adjusting the execution order, and the execution order adjustment in the present solution becomes meaningless.

In an exemplary embodiment of the invention, determining the first execution order value of the command unit based on the command type includes: determining the first execution order value of the command unit for which the command type is a read command as a first value; determining the first execution order value of the command unit of other command types as a second value; wherein the execution priority of the first value is higher than the second value.

For a user-oriented electronic device, the execution delay of read commands is more perceptible, so the service quality of the read operation largely determines the standard of the execution efficiency of the storage device, giving high execution priority to read commands.

In an exemplary embodiment of the invention, the step of adjusting the execution order of each of the command units in each of the command groups according to the first execution order value and the second execution order value of each of the command units further includes: adjusting the execution order of each of the command units in each of the command groups according to the execution priority of the first execution order value; and in a case that the first execution order values are the same, the execution order of each of the commands in each of the command groups is adjusted from large to small according to the second execution order value.

The reference priority of the first execution order value is higher than the reference priority of the second execution order value. When the first priority values are the same, the execution order is adjusted by the second priority, and multi-level adjustment may be performed from large granularity to small granularity, thus making the adjustment more accurate and efficient.

In an exemplary embodiment of the invention, each of the command units in each of the command groups is executed sequentially according to the adjusted execution order; a parsing and a data transmission are performed on each of the command units in each of the command groups in sequence; wherein after the parsing of a current command unit is completed, the parsing is performed on the command unit of the next execution order at a same time that the data transmission is performed on the current command unit. An exemplary embodiment of the invention provides an electronic device, including: a host system, a memory, and a processor electrically connected to the memory, wherein the memory is used to store data sent by the host system and to execute each of the steps described in the command processing method; the processor is configured to execute the command stored in the memory to perform each of the steps described in the command processing method.

An exemplary embodiment of the invention provides a non-transitory computer-readable recording medium. The non-transitory computer-readable recording medium stores a command loaded by a processor to execute each step of the command processing method.

Based on the above, the invention provides a command processing method, an electronic device, and a non-transitory computer-readable recording medium, wherein the order in which the commands are executed at the device end may be determined according to the time interval between consecutive commands and the size of the command unit generated by the commands, thus reducing the waiting time of processing commands, enabling timely response to requests of the host, and improving the efficiency of the UFS memory in processing consecutive commands of the host end.

In order to make the above features and advantages of the invention more clearly understood, embodiments are given below with reference to the accompanying drawings for detailed description.

BRIEF DESCRIPTION OF THE DRAWINGS

The accompanying drawings are included to provide a further understanding of the invention, and are incorporated into and constitute a part of this specification. The drawings illustrate the embodiments of the invention and, together with the description, serve to explain the principles of the invention.

DESCRIPTION OF THE EMBODIMENTS

Figure 1:
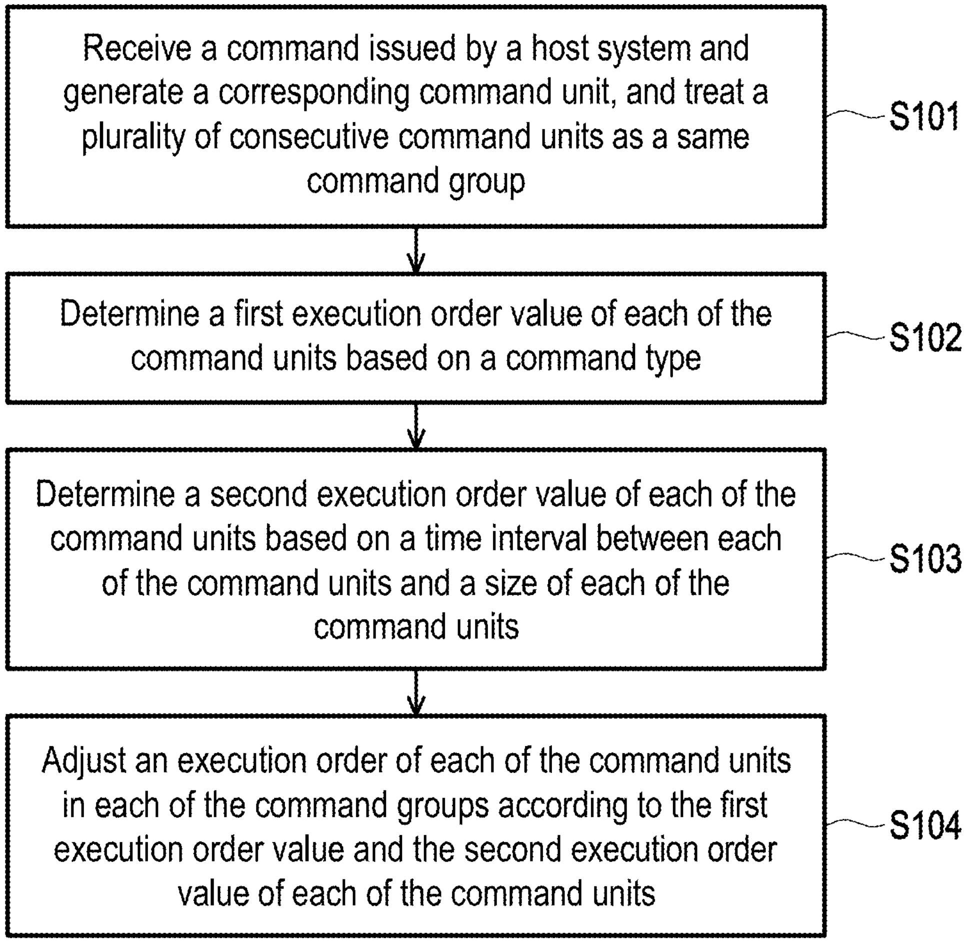
FIG. 1 is a flowchart of a command processing method shown according to an exemplary embodiment of the invention.

Reference will now be made in detail to exemplary embodiments of the invention, examples of which are illustrated in the accompanying drawings. Whenever possible, the same reference numerals are used in the drawings and the description to refer to the same or like parts.

The ordinal numbers used in the specification and the claims of the present application, such as "first", "second", etc., are used to modify elements, and do not themselves imply or represent that the element or elements have any preceding ordinal number and also do not represent the order of one element to another or the order in manufacturing methods. These ordinal numbers are used only to clearly distinguish an element having a certain name from another element having the same name. The claims and the specification may not use the same words, and accordingly, the first member in the specification may be the second member in the claims. It should be noted that the following embodiments may replace, reorganize, or mix the technical features in several different embodiments to implement other embodiments without departing from the spirit of the disclosure.

The command processing mode of Universal Flash Storage (UFS) is from top to bottom, and is in order the application layer (UFS application layer, UAP), the transport layer (UFS transport protocol layer, UTP), the data link layer (UFS inter connect layer, UIC), and the physical layer (PL). For example, when UFS interacts with the host end, the transport layer generates a UFS Protocol Information Unit (UPIU) in response to the commands or the requests of the application layer. The commands or the requests are encapsulated into a fixed data format, and then the data link layer and the physical layer perform device links and physical signal transmission.

In actual applications, the host end (such as the System on Chip (SoC) in electronic devices) adopts a command queue to manage the commands sent from the upper layer. For example, a Universal Transmission Protocol (UTP) queue is used to store UTP commands sent by the upper layer, and the UTP commands are sent to the device for processing. For example, the UTP commands are sent to a Universal Flash Storage (UFS) memory in an electronic device for processing.

Regardless of the stage of command execution, the UFS host and the device exchange information via UPIU. UPIU is a data packet having a fixed format. Each UPIU has a 12-byte header, plus fields related to each UPIU. The minimum size of one UPIU (including the header) is 32 bytes and the maximum size is 65600 bytes. In particular, the packet header defines the type of data packet (such as the command unit, the data unit, and the response unit, etc.), command flag (only valid for the command unit and the response unit, indicating whether the current command is a write command or a read command), and command tag (the command unit, the data unit, and the response unit related to each other have the same command tag), etc.

When the transport layer receives a command request, the transport layer generates a command unit COMMAND UPIU to encapsulate the command. After the host sends a read command to the device, the device needs to return data to the host. The device transmits data to the host via the read data unit DATA IN UPIU; after the host sends a similar write command to the device, the host needs to write data to the device, and the host transmits data to the device via the write data unit DATA OUT UPIU.

The consecutive commands issued by the host are stored in the command queue to be executed. Executing the commands in the command queue sequentially according to the first-in-first-out order is not conductive to the overall execution efficiency and causes the waiting time of the commands to be too long. Therefore, the present solution provides a processing method of commands. FIG. 1 is a flowchart of a command processing method shown according to an exemplary embodiment of the invention.

S101. Receive a command issued by a host system and generate a corresponding command unit, and treat a plurality of consecutive command units as a same command group.

S102. Determine a first execution order value of each of the command units based on a command type.

S103. Determine a second execution order value of each of the command units based on a time interval between each of the command units and a size of each of the command units.

S104. Adjust an execution order of each of the command units in each of the command groups according to the first execution order value and the second execution order value of each of the command units.

The execution order value of each of the command units is determined by the command type, the time interval between the command units, and the size of the command unit, which are multiple factors that affect the execution delay, and accordingly, the execution order of a plurality of command units in the same command group is adjusted to improve the execution efficiency of the commands.

The command processing method is described in detail below in conjunction with the embodiment of FIG. 1. In particular, the HOST end (host system, such as the SoC chip in an electronic device) uses a UTP queue to store UTP commands sent by the upper layer, and sends the UTP commands to the device end (UFS memory) for processing. Each process of the method may be adjusted according to the implementation situation, and is not limited thereto.

In step S101, a command issued by a host system is received and a corresponding command unit is generated, and a plurality of consecutive command units are treated as a same command group.

In some embodiments, the time interval between consecutive command units in the same command group is less than a predetermined threshold.

The timestamp that each command is received obtained, the time when each command is received is determined according to the timestamp information, and the time interval between each of the command units is calculated accordingly. The command processing method in the present solution is executed by determining a plurality of consecutive command units for which the time interval is less than a predetermined threshold as the same command group.

Specifically, if the time intervals between N consecutive commands issued by the host system are all less than the predetermined threshold, and the time interval between the Nth command and the N+1th command is greater than the predetermined threshold, the first N consecutive commands are processed as the same command group. This is to prevent commands that take a longer time to process from being continuously delayed.

In some other embodiments, the consecutive command units generated by consecutive commands received within a predetermined time length are treated as the same command group.

Specifically, the timing starts from when the first command is received. If M commands are received within a predetermined time length, the command units generated by the first M consecutive commands are processed as the same command group. The timer is reset and counting is started again from the time the M+1th command is received. When a large number of consecutive commands are continuously sent, an excess number of command units in the same command group may be avoided.

In step 102, a first execution order value of each of the command units is determined based on the command type.

When a UFS host writes data to a device, whether the device may receive the data at this time and whether the device has enough space to receive the host data need to be considered. Therefore, after a write command is sent to the device, the data is not transmitted to the device immediately, but a notification from the device is awaited.

Figure 2:
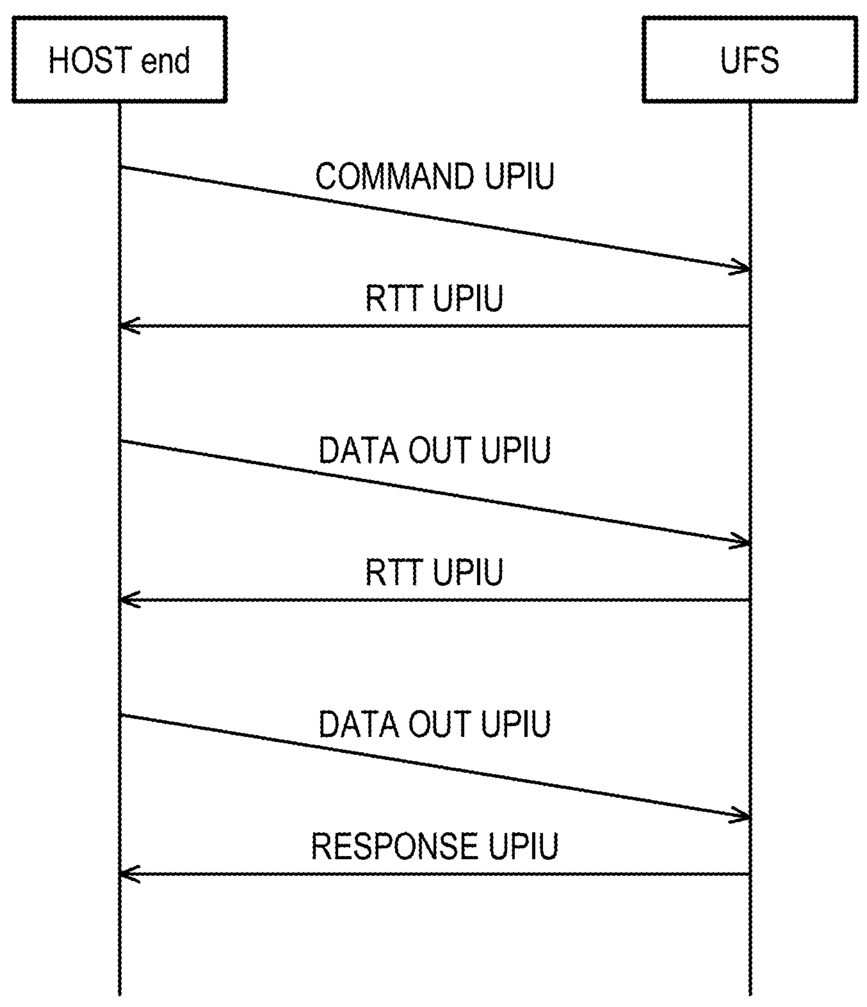
FIG. 2 is a schematic diagram of a write command processing method shown according to an exemplary embodiment of the invention.

Referring to FIG. 2, when the device is ready to receive data, the device informs the host via READY TO TRANSFER UPIU (RTT) that the device may receive data and how much data to receive. After the host receives the RTT, the host starts to transmit data according to the RTT information. Therefore, the host may send DATA OUT UPIU only after receiving the RTT of the device.

The read command does not require this mechanism. This is because after the device obtains data from the flash memory, the device controls the transmission of the data. For the host, before the read command is sent, sufficient space is prepared to receive data, so there is no situation in which the host has no space to receive data.

Moreover, write commands require more command processing time when executed. Delaying the execution order of commands with longer command processing time is beneficial to improving the overall execution efficiency of the system and reducing the total execution delay of consecutive commands. Moreover, the response speed of the read command is more important to the host system, and most application platforms have higher latency requirements for read operations than for write operations.

In some embodiments, a first execution order value of a command unit for which the command type is a read command is determined as a first value; the first execution order value of command unit of other command types is determined as the second value; wherein the execution priority of the first value is higher than the second value. If the first execution order value of the read command is determined to be 1, and the first execution order value of the command unit of other command types is determined to be 0, the execution priority of the command unit for which first execution order value is 1 is higher than the execution priority of the command unit for which first execution order value is 0.

Improving the execution priority of read commands and accelerating the response speed of data read operations are beneficial to optimizing the overall service quality of the system.

In step S103, a second execution order value of each of the command units is determined based on the time interval between each of the command units and the size of each of the command units.

The timestamp that each command is received obtained, the time when each of the commands is received is determined according to the timestamp information, and the time interval between each of the command units is calculated accordingly.

Figure 3:
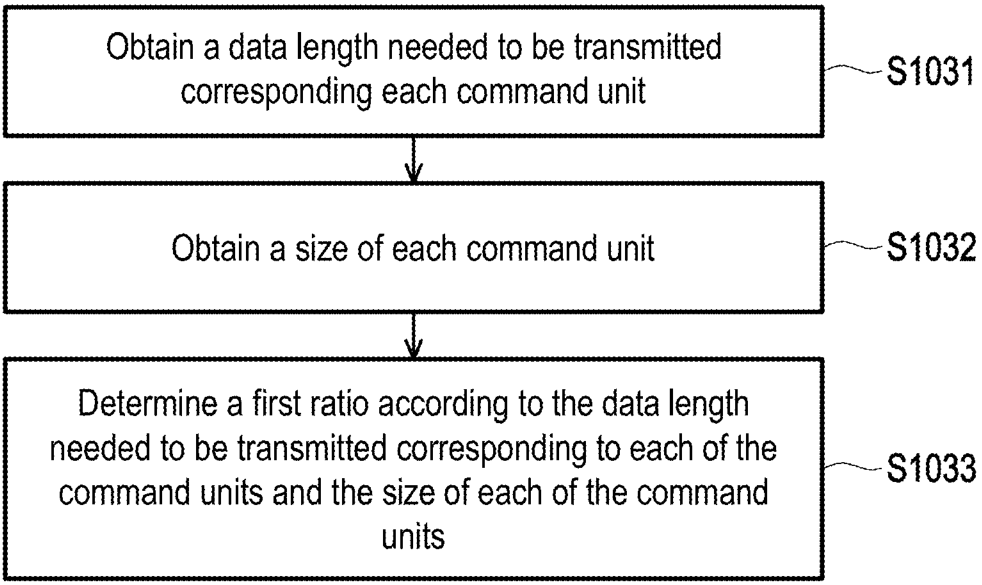
FIG. 3 is a flowchart of determining the execution order value of each command according to an exemplary embodiment of the invention.

In an embodiment, step S103 further includes steps S1031, S1032, and S1033. Please refer to FIG. 3. FIG. 3 is a flowchart of determining the second execution order value of each of the commands according to an embodiment of the invention.

In step S1031, the data length needed to be transmitted corresponding to each of the command units is obtained.

In step S1032, the size of each of the command units is obtained. In particular, the size of the command unit UPIU generated corresponding to each of the commands is related to the command processing time corresponding to each of the commands.

In step S1033, a first ratio is determined according to the data length needed to be transmitted corresponding to each of the command units and the size of each of the command units. In particular, the first ratio may specifically be the ratio between the data length needed to be transmitted corresponding to each of the command units and the size of the command unit UPIU generated corresponding to each of the commands.

It should be noted that the present application does not limit the execution order of step S1031 and step S1032. Step S1032 may be executed after step S1031. Alternatively, step S1032 is executed first and then step S1031 is executed.

In an embodiment, the second execution order value of each of the commands is determined based on the time interval between each of the command units and the first ratio of each of the command units. In particular, for any command unit, the time interval for calculating the second execution order value thereof is the time difference between receiving the current command unit and receiving the next consecutive command unit.

Furthermore, a first weight may be set for the time interval between each of the commands, and a second weight may be set for the first ratio, and the execution order value of each of the commands is determined based on the time interval between each of the commands and the first weight, the first ratio, and the second weight.

In an embodiment, the HOST end uses the UTP queue to store the UTP commands (including a command A, a command B, and a command C) sent by the upper layer, and continuously sends the command A, the command B, and the command C to the device end. The command A, the command B, and the command C generate corresponding command units UPIU via the transport layer, namely $A_{UPIU}$, $B_{UPIU}$, and $C_{UPIU}$ respectively.

In particular, the time interval between the command unit $A_{UPIU}$ and the command unit $B_{UPIU}$ is $T_a$, which is used to calculate the second execution order value of the command unit $A_{UPIU}$; the time interval between the command unit $B_{UPIU}$ and the command unit $C_{UPIU}$ is $T_b$, which is used to calculate the second execution order value of the command unit $B_{UPIU}$. The data lengths needed to be transmitted for the command unit $A_{UPIU}$, the command unit $B_{UPIU}$, and the command unit $C_{UPIU}$ are $Len_A$, $Len_B$, and $Len_C$ respectively, and the sizes of the command unit $A_{UPIU}$, the command unit $B_{UPIU}$, and the command unit $C_{UPIU}$ are $Size_A$, $Size_B$, and $Size_C$ respectively.

In the following, first ratios $K_A$, $K_B$, and $K_C$ respectively corresponding to the command unit $A_{UPIU}$, the command unit $B_{UPIU}$, and the command unit $C_{UPIU}$ may be determined respectively according to the data length ($Len_A$, $Len_B$, and $Len_C$) needed to be transmitted by the command A, the command B, and the command C and the size of the command unit UPIU data packet ($Size_A$, $Size_B$, and $Size_C$). Since the first ratio is the ratio between the data length needed to be transmitted corresponding to each of the command units and the size of each of the command units UPIU, the first ratio $K_A=Len_A/Size_A$ corresponding to the command unit $A_{UPIU}$, the first ratio $K_B=Len_B/Size_B$ corresponding to the command unit $B_{UPIU}$, and the first ratio $K_C=Len_C/Size_C$ corresponding to the command unit $C_{UPIU}$ may be obtained.

Furthermore, a first weight m is set for the time interval T between each of the commands, and a second weight n is set for the first ratio K, wherein $0 \le m \le 1$, $0 \le n \le 1$. According to $Order=mT+nK$, second execution order values $Order_A$, $Order_B$ and $Order_C$ corresponding to the command unit $A_{UPIU}$, the command unit $B_{UPIU}$, and the command unit $C_{UPIU}$ are calculated respectively. Thus, the execution order value corresponding to the command A is $Order_A=mT_A+nK_A$, the execution order value corresponding to the command B is $Order_B=mT_B+nK_B$, and the execution order value corresponding to the command C is $Order_C=mT_C+nK_C$.

Lastly, the execution order of the command A, the command B, and the command C is determined according to the sizes of the second execution order values $Order_A$, $Order_B$, and $Order_C$ corresponding to the command A, the command B, and the command C respectively.

In step S104, the execution order of each of the command units in each of the command groups is adjusted according to the first execution order value and the second execution order value of each of the command units.

In some embodiments, the execution order of each of the command units in each of the command groups is adjusted according to the execution priority of the first execution order value. Moreover, in a case that the first execution order values are the same, the execution order of each of the commands in each of the command groups is adjusted from large to small according to the second execution order value.

According to the first execution order value, the execution order of the command unit of the read command type is first adjusted to be executed before the command unit of other command types, so as to ensure the priority response of the read command.

Secondly, for command units having the same first execution priority value, such as command units of the read command type, the execution order thereof is adjusted according to the second execution priority value. Since the data length to be transmitted by the command is related to the time needed for data transmission, the larger the data length, the longer the data transmission takes. The size of the command unit is related to the time needed for command processing (command parsing time). The larger the size of the command unit, the longer the time needed for command parsing. The execution order is adjusted from large to small according to the second order value, that is, the command having the largest second execution order value is processed first, and the command having the smallest second execution order value is executed last.

In some embodiments, after the execution order of each of the command units in each of the command groups is adjusted according to the first execution order value and the second execution order value of each of the command units, each of the command units in each of the command groups is executed sequentially according to the adjusted execution order.

The execution of command units includes two stages: parsing and data transmission. After parsing the current command unit, the corresponding data transmission operation is performed according to the information carried by the command unit. In the case of a read command, the device parses the command unit and transmits data to the host via the read data unit DATA IN UPIU; in the case of a write command, after the device parses the command unit, the device first informs the host that data may be transmitted via the response unit RTT. After receiving the RTT, the host transmits data to the device via the write data unit DATA OUT UPIU.

Parsing and data transmission are performed on each of the command units in each of the command groups in sequence. In particular, after the parsing of the current command unit is completed, the parsing is performed on the command unit of the next execution order at the same time that the data transmission is performed on the current command unit.

Figure 4:
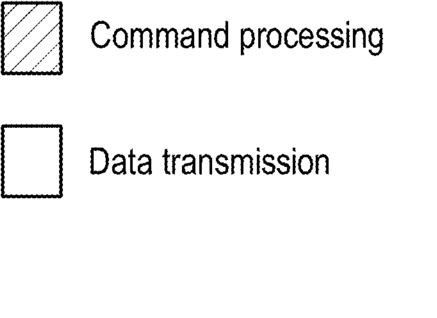
FIG. 4 is a schematic diagram of adjusting the execution order of each command according to the execution order value according to an exemplary embodiment of the invention.
Figure 4:
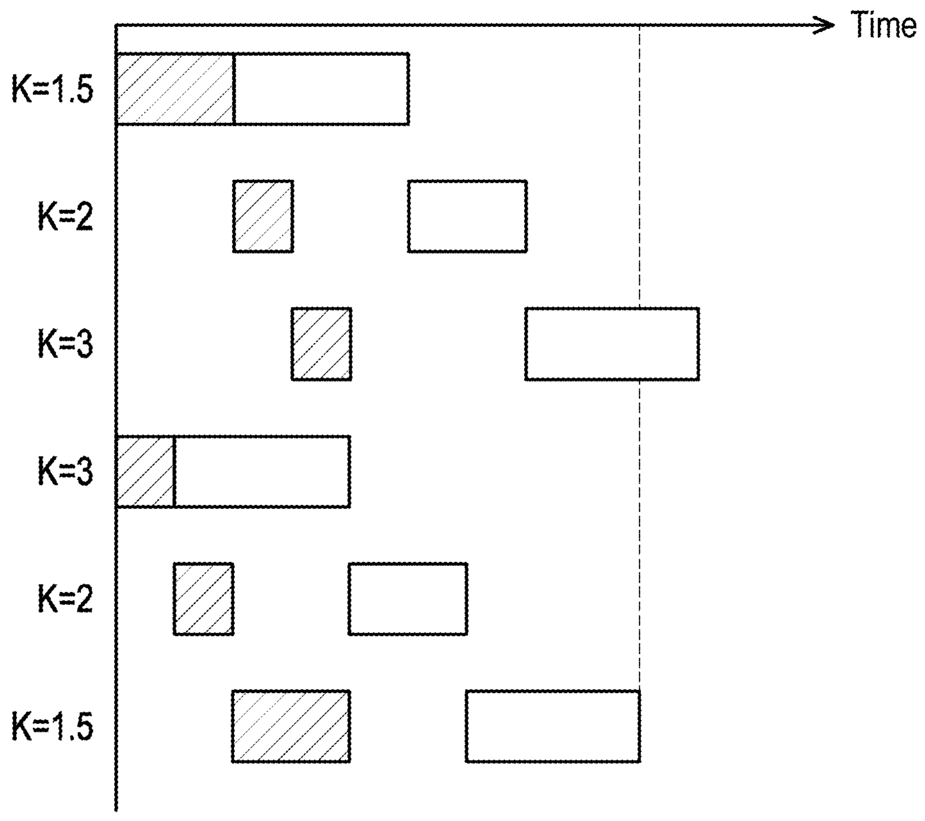

FIG. 4 is a schematic diagram of adjusting the execution order of each command according to a second execution order value according to an embodiment of the invention. After the execution order is adjusted according to the first execution order value, the execution order of command units having the same first execution order value is adjusted according to the second execution order value, wherein assuming that the time interval T is the same, the execution order of the command units is only related to the first ratio K. The larger the first ratio K is, the larger the second execution order value is, and the higher the priority of the execution order of the command unit is. According to the execution order from large to small according to the first ratio K, the total execution delay of the three command units is significantly shorter than the total execution delay of the execution according to the execution order from small to large of the first ratio K.

While data is being transmitted to a command unit, another command unit may be parsed and processed at the same time. Processing the command unit having a larger data transmission time ratio first is beneficial to improving the overall processing efficiency of a plurality of consecutive command units. Therefore, commands having a larger first ratio K are executed first to shorten the total time spent on executing commands.

The present solution determines the execution order value and adjusts the execution order of commands from two different dimensions to achieve the object of reducing the waiting time of processing commands, may respond to the request of the HOST end in time, and improves the efficiency of the UFS memory in processing consecutive commands of the HOST end.

Figure 5:
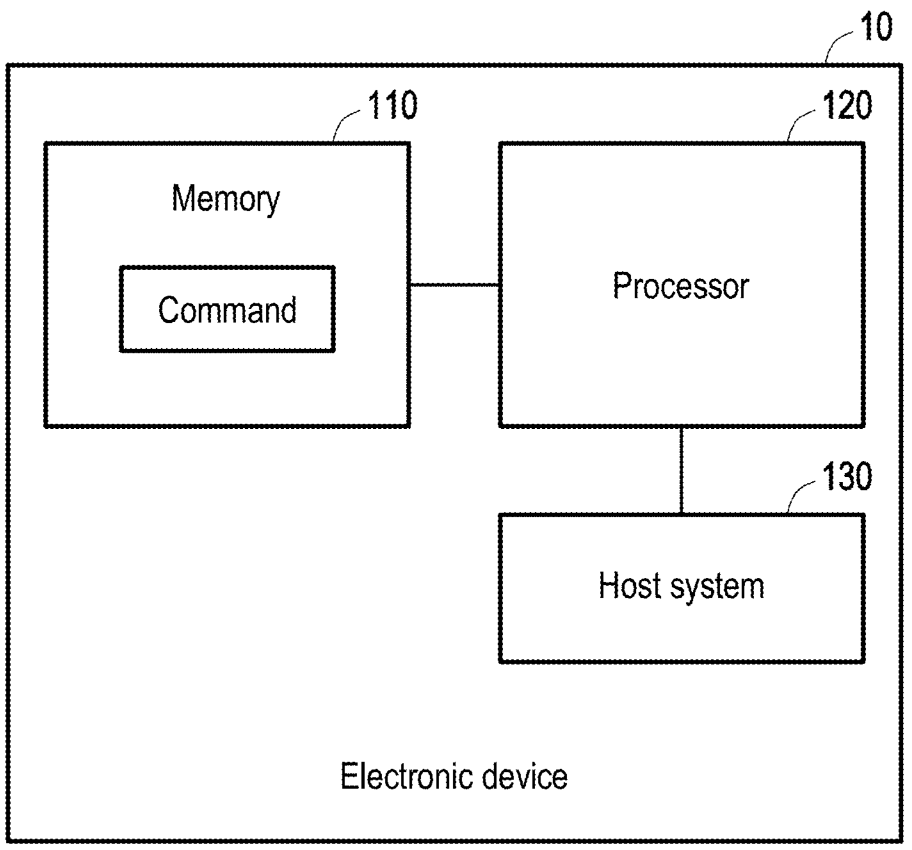
FIG. 5 is a schematic diagram of an electronic device shown according to an exemplary embodiment of the invention.

FIG. 5 is a schematic diagram of an electronic device shown according to an exemplary embodiment of the invention.

Referring to FIG. 5, an electronic device 10 includes a memory 110, a processor 120, and a host system 130.

In an embodiment of the application, the electronic device may be a device such as a mobile phone, a computer, a tablet, and the embodiments of the present application are not specifically limited thereto.

The electronic device in an embodiment of the present application may be a device having an operating system. The operating system may be an Android operating system, an iOS operating system, or other possible operating systems, which are not specifically limited in the embodiments of the present application.

In one application scenario, UFS memory is widely used as a new type of storage device in electronic devices, and the SoC in the electronic device acts as the HOST end of the UFS memory and adopts the data structure of the command queue to manage the commands issued by the upper-level application program. The HOST end may communicate with the UFS memory as the device end via the host controller interface (HCl). The command queue may specifically be a queue in an HCl interface, and the command queue may also be called a HOST queue, a UFS queue, and the like. In particular, the UFS protocol stack may be divided into three layers: UFS application layer, UFS transport layer, and UFS link layer. The command queue may be a UTP queue, and the UTP queue may be a queue in the UFS transport layer for recording UTP commands generated in the UFS transport layer. The UTP commands may be commands complying with the UTP protocol. Furthermore, the UTP commands in the UTP queue may be sent to the UFS memory for processing, and accordingly, the UTP queue may also cache response information of the corresponding commands of the UFS memory. In particular, the command sent by the upper layer application may be a Small Computer System Interface (SCSI) command. The SCSI command is eventually converted into a UTP command by the driver and cached in the UTP queue to wait for processing. Exemplarily, the UTP command may be written to a fixed memory address corresponding to the UTP queue, wherein the memory address may be an input/output (IO) interface address of the UFS memory.

The memory 110 is used to store a command, various software, data, and various program codes needed for the command processing system 10 to run. The memory 110 is, for example, any type of fixed or removable random-access memory (RAM), read-only memory (ROM), flash memory, hard disk drive (HDD), solid-state drive (SSD), or similar components or a combination of the above components, and is used to store various application programs and commands that may be executed by a processor 120.

The processor 120 may be, for example, a central processing unit (CPU), or other programmable general-purpose or special-purpose micro control unit (MCU), microprocessor, digital signal processor (DSP), programmable controller, application-specific integrated circuit (ASIC), graphics processing unit (GPU), image signal processor (ISP), image processing unit (IPU), arithmetic logic unit (ALU), complex programmable logic device (CPLD), field-programmable gate array (FPGA), or other similar elements or a combination of these elements. The processor 120 may be electrically connected to the memory 110, and access and execute a command and various application programs stored in the memory 110.

The present application also provides a non-transitory computer-readable recording medium. The non-transitory computer-readable recording medium stores a program or a command. When the program or the command is executed by the processor, the steps of the method of the above embodiment are implemented and the same technical effect may be achieved. To avoid repetition, the above is not described here.

Via the description of the above implementation modes, those skilled in the art may clearly understand that the above embodiment method may be implemented by means of software plus a necessary general hardware platform. Of course, it may also be done via hardware, but in many cases the former is a better implementation method. Based on this understanding, the technical solution of the present application, or the part contributing to the prior art, may be embodied in the form of a computer software product. The computer software product is stored in a storage medium (such as ROM/RAM, magnetic disk, optical disk) and includes several commands for enabling a terminal (which may be a mobile phone, a computer, a server, or a network device, etc.) to execute the methods described in the various embodiments of the present application.

Based on the above, an exemplary embodiment of the invention provides a command processing method, an electronic device, and a non-transitory computer-readable recording medium, wherein the order in which the commands are executed at the device end may be determined according to the command type and the time interval between consecutive commands and the size of the command unit generated by the commands, thus reducing the waiting time of processing commands, enabling timely response to requests of the host, and improving the efficiency of the UFS memory in processing consecutive commands of the host end.

Lastly, it should be noted that the above embodiments are only used to illustrate the technical solutions of the invention, rather than to limit them. Although the invention has been described in detail with reference to the above embodiments, it should be understood by those skilled in the art that: it is still possible to modify the technical solutions recited in each of the above embodiments, or to replace part or all of the technical features therein with equivalents. However, these modifications or substitutions do not make the essence of the corresponding technical solutions deviate from the scope of the technical solutions of the embodiments of the invention.

What is claimed is:

1. A command processing method, comprising:

receiving a command issued by a host system and generating a corresponding command unit, and treating a plurality of consecutive command units as a same command group;

determining a first execution order value of each of the plurality of consecutive command units based on a command type of each of the plurality of consecutive command units;

determining a second execution order value of each of the plurality of consecutive command units based on a time interval between each of the plurality of consecutive command units and a size of each of the plurality of consecutive command units, wherein the time interval between each of the plurality of consecutive command units is a time difference between receiving a current command unit and receiving a next consecutive command unit following the current command unit;

adjusting an execution order of each of the plurality of consecutive command units in the same command group according to the first execution order value and the second execution order value of each of the plurality of consecutive command units, executing the plurality of consecutive command units in the same command group in sequence according to an adjusted execution order;

performing a parsing and a data transmission on each of the plurality of consecutive command units in the same command group in sequence; wherein after the parsing of the current command unit is completed, the parsing is performed on a next command unit of the adjusted execution order at the same time that the data transmission is performed on the current command unit.

2. The command processing method of claim 1, wherein the step of determining the second execution order value of each of the plurality of consecutive command units based on the time interval between each of the plurality of consecutive command units and the size of each of the plurality of consecutive command units, further comprises:

obtaining a data length needed to be transmitted by each of the plurality of consecutive command units; and determining a first ratio of each of the plurality of consecutive command units according to the data length needed to be transmitted by each of the plurality of consecutive command units and the size of each of the plurality of consecutive command units.

3. The command processing method of claim 2, wherein the step of determining the second execution order value of each of the plurality of consecutive command units based on the time interval between each of the plurality of consecutive command units and the size of each of the plurality of consecutive command units further comprises:

determining the second execution order value of each of the plurality of consecutive command units based on the time interval between each of the plurality of consecutive command units and the first ratio of each of the plurality of consecutive command units.

4. The command processing method of claim 3, wherein the step of determining the second execution order value of each of the plurality of consecutive command units based on the time interval between each of the plurality of consecutive command units and the first ratio of each of the plurality of consecutive command units further comprises:

setting a first weight and a second weight for the time interval between each of the plurality of consecutive command units and the first ratio respectively; and determining the second execution order value of each of the plurality of consecutive command units based on the time interval between each of the plurality of consecutive command units and the first weight, the first ratio, and the second weight.

5. The command processing method of claim 1, wherein the time interval between each of the plurality of consecutive command units in the same command group is less than a predetermined threshold.

6. The command processing method of claim 1, wherein determining the first execution order value of each of the plurality of consecutive command unit based on the command type of each of the plurality of consecutive command units comprises:

determining the first execution order value of the plurality of the command unit for which the command type is a read command as a first value;

determining the first execution order value of the command unit of other command types as a second value;

wherein an execution priority of the first value is higher than an execution priority of the second value.

7. The command processing method of claim 1, wherein the step of adjusting the execution order of each of the plurality of consecutive command units in the command group according to the first execution order value and the second execution order value of each of the plurality of consecutive command units further comprises:

adjusting the execution order of each of the plurality of consecutive command units in the same command group according to an execution priority of the first execution order value; and adjusting the execution order of each of the plurality of consecutive commands in the same command group from large to small according to the second execution order value in a case that the first execution order values are the same.

8. An electronic device, comprising:

a host system;

a memory configured to store data issued by the host system and instructions for performing the method of claim 1; and a processor electrically connected to the memory and the host system, respectively, and configured to execute the instructions stored in the memory to perform the method of claim 1.

9. A non-transitory computer-readable recording medium, wherein the non-transitory computer-readable recording medium stores a command loaded by a processor to execute the method of claim 1.

* * * * *